(12) United States Patent
McGahay (10) Patent No.: US 7,979,151 B2
(45) Date of Patent: Jul. 12, 2011

(54) RUN-TIME DISPATCH SYSTEM FOR ENHANCED PRODUCT CHARACTERIZATION CAPABILITY

(75) Inventor: Vincent J. McGahay, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 826 days.

(21) Appl. No.: 11/951,503

(22) Filed: Dec. 6, 2007

(65) Prior Publication Data

US 2009/0149979 A1    Jun. 11, 2009

(51) Int. Cl.
G06F 19/00    (2011.01)
(52) U.S. Cl. ............ 700/101; 700/99; 700/108; 700/117
(58) Field of Classification Search .................... 700/99, 700/101, 108, 117
See application file for complete search history.

(56) References Cited

U.S. PATENT DOCUMENTS

| | | | |
|---|---|---|---|
| 6,084,590 A | 7/2000 | Robotham et al. | |
| 6,087,340 A | 7/2000 | Gatti et al. | |
| 6,107,285 A | 8/2000 | Gatti et al. | |
| 6,126,919 A | 10/2000 | Stefely et al. | |
| 6,170,917 B1 | 1/2001 | Heinrich et al. | |
| 6,284,738 B1 | 9/2001 | Gatti et al. | |
| 6,416,742 B1 | 7/2002 | Stefely et al. | |
| 6,442,445 B1 | 8/2002 | Bunkofski et al. | |
| 6,558,704 B1 | 5/2003 | Bartholomaeus et al. | |
| 6,732,057 B2 | 5/2004 | Hamad | |
| 6,733,781 B2 | 5/2004 | Abu-Izza et al. | |
| 6,748,279 B2 | 6/2004 | Bennett | |
| 6,790,686 B1 | 9/2004 | Purdy et al. | |
| 6,941,183 B1 | 9/2005 | Huang et al. | |
| 7,005,421 B2 | 2/2006 | Gatti et al. | |
| 7,085,614 B1 | 8/2006 | Gartland et al. | |
| 7,087,846 B2 | 8/2006 | Alcoe | |
| 7,151,972 B2 | 12/2006 | Denton et al. | |
| 7,171,897 B2 | 2/2007 | Barajas et al. | |
| 7,197,414 B2 | 3/2007 | Matsushita et al. | |
| 7,218,981 B1 | 5/2007 | Ho et al. | |
| 2002/0116083 A1* | 8/2002 | Schulze ........................ 700/108 |
| 2002/0151989 A1 | 10/2002 | Bennett | |
| 2004/0155208 A1 | 8/2004 | Ikeda et al. | |
| 2005/0010308 A1 | 1/2005 | Bennett | |
| 2006/0064190 A1 | 3/2006 | Wang et al. | |

\* cited by examiner

Primary Examiner — Albert Decady
Assistant Examiner — Tejal J Gami
(74) Attorney, Agent, or Firm — Gibb I.P. Law Firm, LLC; Yuanmin Cai, Esq.

(57) ABSTRACT

Disclosed herein are embodiments of an automated manufacturing system that is used to process multiple jobs in a product fabrication environment, where such processing comprises performing the same multiple consecutive process steps for each job and where each process step can be accomplished using one or more different available processing tools. The manufacturing system incorporates a unique run-time dispatch system. This dispatch system schedules the order in which jobs will be processed and further randomly assigns a particular combination of process steps and tools to each job in such a way that the processing tools are evenly distributed across the jobs. Ensuring even distribution of processing tools allows a statistical process control system to not only detect, for a given process step, product variability outside desired specifications, but also to efficiently de-convolve such product variability.

17 Claims, 7 Drawing Sheets

| No. Of Factorial Combinations | PROCESS STEP A | PROCESS STEP B | PROCESS STEP C | RUN ORDER |
|---|---|---|---|---|
| 1 | Tool A1 | Tool B1 | Tool C1 | 6 |
| 2 | Tool A1 | Tool B1 | Tool C2 | 1 |
| 3 | Tool A1 | Tool B2 | Tool C1 | 3 |
| 4 | Tool A1 | Tool B2 | Tool C2 | 8 |
| 5 | Tool A2 | Tool B1 | Tool C1 | 4 |
| 6 | Tool A2 | Tool B1 | Tool C2 | 5 |
| 7 | Tool A2 | Tool B2 | Tool C1 | 7 |
| 8 | Tool A2 | Tool B2 | Tool C2 | 2 |

Exemplary Full Factorial Combinations For Fabrication Having Three Process Steps With Two Tools Available In Each Step In Which Run Order Of Combinations Is Assigned To Ensure Fractional Factorial Combinations Are Completed First

| No. Of Full Factorial Combinations | PROCESS STEP A | PROCESS STEP B | PROCESS STEP C |
|---|---|---|---|
| 1 | Tool A1 | Tool B1 | Tool C1 |
| 2 | Tool A1 | Tool B1 | Tool C2 |
| 3 | Tool A1 | Tool B2 | Tool C1 |
| 4 | Tool A1 | Tool B2 | Tool C2 |
| 5 | Tool A2 | Tool B1 | Tool C1 |
| 6 | Tool A2 | Tool B1 | Tool C2 |
| 7 | Tool A2 | Tool B2 | Tool C1 |
| 8 | Tool A2 | Tool B2 | Tool C2 |

Exemplary Full Factorial Of Combinations For A Fabrication Having Three Process Steps With Two Tools Available In Each Step

Figure 3

| No. Of Fractional Factorial Combinations | PROCESS STEP A | PROCESS STEP B | PROCESS STEP C |
|---|---|---|---|
| 1 | Tool A1 | Tool B1 | Tool C2 |
| 2 | Tool A1 | Tool B2 | Tool C1 |
| 3 | Tool A2 | Tool B1 | Tool C1 |
| 4 | Tool A2 | Tool B2 | Tool C2 |

Exemplary Fractional (E.g. ½) Factorial Combinations For Fabrication Having Three Process Steps With Two Tools Available In Each Step

Figure 4

| No. Of Factorial Combinations | PROCESS STEP A | PROCESS STEP B | PROCESS STEP C | RUN ORDER |
|---|---|---|---|---|
| 1 | Tool A1 | Tool B1 | Tool C1 | 6 |
| 2 | Tool A1 | Tool B1 | Tool C2 | 1 |
| 3 | Tool A1 | Tool B2 | Tool C1 | 3 |
| 4 | Tool A1 | Tool B2 | Tool C2 | 8 |
| 5 | Tool A2 | Tool B1 | Tool C1 | 4 |
| 6 | Tool A2 | Tool B1 | Tool C2 | 5 |
| 7 | Tool A2 | Tool B2 | Tool C1 | 7 |
| 8 | Tool A2 | Tool B2 | Tool C2 | 2 |

Exemplary Full Factorial Combinations For Fabrication Having Three Process Steps With Two Tools Available In Each Step In Which Run Order Of Combinations Is Assigned To Ensure Fractional Factorial Combinations Are Completed First

RUN-TIME DISPATCH SYSTEM FOR ENHANCED PRODUCT CHARACTERIZATION CAPABILITY

BACKGROUND

1. Field of the Invention

The embodiments of the invention generally relate to manufacturing execution systems and, more particularly, to an improved dispatch system, method and computer program product for monitoring and controlling the flow of articles of manufacture through the fabrication process such that tool usage is evenly distributed throughout the fabrication process.

2. Description of the Related Art

In automated manufacturing systems, manufacturing execution systems (MES) are typically used to monitor and control all aspects of product fabrication and production. For example, the MES can be adapted to control collection and storage of data, manage work orders, manage and control manufacturing processes, monitor and correct manufacturing processes, manage inventory, etc. In order to accomplish these tasks, the MES can be integrated with various other systems.

For example, in order to manage process flow, the MES can be integrated with a run-time dispatch system. Specifically, manufacturing processes, such as wafer-level integrated circuit (IC) fabrication, generally involve a large number of process steps (e.g., film depositing, photolithographic patterning, pattern transferring (i.e., etching), polishing, annealing, dopant implanting, etc.). During any one of theses steps, multiple tools are often available for use. For example, one or more deposition tools may be available, one or more lithography tools may be available, one or more etching tools may be available, etc. Additionally, within each of these tools, multiple process chambers may be available. Thus, for a given IC product design, each lot of wafers may be processed by different tools at different steps in the manufacturing process. Additionally, within each lot, each wafer may be processed by different chambers within a given tool. A run-time dispatch system can be integrated with the MES in order to schedule the order in which individual lots will be processed and also to assign available tools to particular lots at each process step. Typically, such dispatch systems prioritize scheduling and tool assignment based on various parameters (e.g., priority of jobs, tool availability, etc.). If no one lot has priority and all tools are available, dispatch (i.e., scheduling and tool assignment) is often arbitrary.

Given the number of process steps, the number of tools available at each step and the number of chambers available in each tool, the total number of possible combinations of process steps and tools which may be assigned by the dispatch system to any given job is very large. If the number of different chambers available in each tool is also factored in, the number of possible process combinations becomes even greater. This large number of process combinations allows each lot to flow smoothly through a fabrication facility. Unfortunately, the same large number of possible process combinations subsequently makes it difficult to identify a faulty tool or chamber, when a manufacturing defect is detected during processing.

SUMMARY

Disclosed herein are embodiments of an automated manufacturing system that is used to process multiple jobs in a fabrication environment, where such processing comprises performing the same multiple process steps for each job and where each process step can be accomplished using one or more different available processing tools.

The system comprises a data storage device. This data storage device is adapted to store lists of the different processing tools. Each list comprises at least one process-specific tool that is adapted to and available for performing a specific process step. Thus, each list indicates the different tools that can be used to perform a specific process step required for processing and further indicates whether or not those tools are currently available.

The system also comprises a dispatch system. This dispatch system comprises a scheduling unit and an assignment unit. The scheduling unit is adapted to determine the order for processing multiple jobs. That is, the scheduling unit schedules the order in which each one of multiple jobs will be processed and, more specifically, schedules the order in which each of the jobs will undergo the same multiple process steps required for processing. The assignment unit on the other hand assigns a combination of process steps and tools that will be associated with a single job during processing. That is, the assignment unit is in communication with the data storage device and adapted to access the tool lists that are stored in the data storage device in order to determine, based on those lists, all of the possible combinations of process steps and tools that can be used to process any single job. The assignment unit is further adapted to randomly assign those combinations to the different jobs. Thus, as the jobs are processed (i.e., as the jobs undergo the same multiple process steps) by the different processing tools according to the combination assigned by the assignment unit and according to the order scheduled by the scheduling unit, the processing tools are evenly distributed across the jobs.

Also disclosed are embodiments of an associated dispatching method for use in a fabrication environment, where each one of multiple jobs is to undergo the same multiple process steps and where each process step can be accomplished using one or more different available processing tools.

The method embodiments comprise scheduling the order for processing the jobs. That is, the order in which each of the multiple jobs will undergo the same multiple process steps required for processing is scheduled.

The method embodiments also comprise storing lists of different processing tools. Each list comprises at least one process-specific tool that is adapted to and available for performing a specific process step. Thus, each list indicates the different tools that can be used to perform a specific process step required for processing and further indicates whether or not those tools are currently available.

These lists are accessed and, then, based on the lists, all the possible combinations of process steps and tools for processing any single job are determined. Next, these combinations are randomly assigned to the multiple jobs that require processing. Finally, the jobs are processed (i.e., the multiple process steps are performed) according to the scheduled job order and with the assigned combinations of process steps and tools such that the processing tools are evenly distributed across the jobs.

Also disclosed is a program storage device readable by computer and tangibly embodying a program of instructions executable by the computer to perform the above-described dispatching method.

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of these embodiments without departing from the spirit thereof, and these embodiments should be considered to include all such changes and modifications.

BRIEF DESCRIPTION OF THE DRAWINGS

The embodiments of the invention will be better understood from the following detailed description with reference to the drawings, in which.

DETAILED DESCRIPTION OF EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As mentioned above, in automated manufacturing systems, manufacturing execution systems (MES) are typically used to monitor and control all aspects of product fabrication and production. For example, the MES can be adapted to control collection and storage of data, manage work orders, manage and control manufacturing processes, monitor and correct manufacturing processes, manage inventory, etc. In order to accomplish these tasks, the MES can be integrated with various other systems.

For example, in order to manage process flow, the MES can be integrated with a run-time dispatch system. Specifically, manufacturing processes, such as wafer-level integrated circuit (IC) fabrication, generally involve a large number of process steps (e.g., film depositing, photolithographic patterning, pattern transferring (i.e., etching), polishing, annealing, dopant implanting, etc.). During any one of theses steps, multiple tools are often available for use. For example, one or more deposition tools may be available, one or more lithography tools may be available, one or more etching tools may be available, etc. Additionally, within each of these tools, multiple process chambers may be available. Thus, for a given IC product design, each lot of wafers may be processed by different tools at different steps in the manufacturing process. Additionally, within each lot, each wafer may be processed by different chambers within a given tool. A run-time dispatch system can be integrated with the MES in order to schedule the order in which individual lots will be processed and also to assign available tools to particular lots at each process step. Typically, such dispatch systems prioritize scheduling and tool assignment based on various parameters (e.g., priority of jobs, tool availability, etc.). If no one lot has priority and all tools are available, dispatch (i.e., scheduling and tool assignment) is often arbitrary.

Given the number of process steps, the number of tools available at each step and the number of chambers available in each tool, the total number of possible combinations of process steps and tools which may be assigned by the dispatch system to any given job is very large. If the number of different chambers available in each tool is also factored in, the number of possible process combinations becomes even greater. This large number of process combinations allows each lot to flow smoothly through a fabrication facility. Unfortunately, the same large number of possible process combinations subsequently makes it difficult to identify a faulty tool or chamber, when a manufacturing defect is detected during processing.

As an example, consider resistance control of a critical wire path created by damascene processing on an IC product. The wire resistance will ultimately depend on, among other things, the etch process tool and, more particularly, the reactive ion etch (RIE) etch chamber used within the tool because RIE determines line depth and also the chemical mechanical polishing (CMP) polishing tool and, more particularly, the CMP polisher head because CMP determines the final line height. If five etching tools and five polishing tools are available at the etching and polishing process steps, respectively, then the total number of possible tool combinations is 25 (i.e., 5×5). Furthermore, if four chambers are available in each etching tool and four heads are available on each polishing tool, the possible combinations increase to 400 (i.e., 5×4×5× 4). Obviously, the number of process combinations increase as additional processes (e.g., lithography, metallization, etc.) are considered.

Each of the individual process steps are typically monitored by statistical process control (SPC) system, which is also integrated with the MES. Specifically, SPC systems monitor the process steps by collecting data from samples at various points within each process. Variations in the process that may affect the quality of the end product or service can be detected and charted by the SPC system. Thus, SPC systems are useful for determining whether a process steps fails or drifts out of specification. However, such systems do not provide a means of adequately determining which particular tool used in a given process step or combination of tools used to perform multiple process steps in a sequence, causes the largest contribution to variability in the product (e.g. the largest contribution to variability in wire resistance in the aforementioned example). This must be done by comparing the parameter of interest across tools using a technique such as analysis of variance (ANOVA). However, unless the samples that are drawn for analysis (e.g., from the RIE tool populations) are equally distributed across the CMP tools, it is difficult to separate the observed variation into its components. Attempts to resolve this difficulty have included using a very large sample that satisfies the independence of process factors and/or running an experiment designed to achieve this. Unfortunately, both of these approaches have disadvantages. That is, the former requires an extended amount of time to acquire a sufficiently large sample and the latter typically represents only a snapshot in time and, therefore, may not be reflective of more general behavior. Given the usefulness of understanding how particular chambers, tools, or tools sets control product variation, it is desirable to have a manufacturing system and, more particularly, a dispatch system which has the principles of a design of experiment (DOE) built into its day-to-day operation.

In view of the foregoing, disclosed herein are embodiments of an automated manufacturing system that is used to process multiple jobs in a product fabrication environment (e.g., in an integrated circuit (IC) product fabrication environment), where such processing comprises performing the same multiple consecutive process steps for each job and where each process step can be accomplished using one or more different available processing tools. The manufacturing system incorporates, among other components, a unique run-time dispatch (RTD) system. Specifically, during manufacture, this run-time dispatch system schedules the order for processing jobs. That is, it establishes the order in which multiple sets of work pieces, for example, multiple lots of semiconductor wafers, will be processed. The run-time dispatch system further randomly assigns a particular combination of process steps and tools to each job (i.e., to each set of work pieces being processed, for example, to each lot of semiconductor wafers being processed) in such a way that the processing tools are evenly distributed across the jobs. Ensuring even distribution of processing tools allows a statistical process control (SPC) system to not only detect, for a given process step, product variability outside desired specifications, but also to efficiently de-convolve such product variability in order to identify the specific tool that is the source of the product variability or even to identify process step interactions that contribute to product variability.

Figure 1:
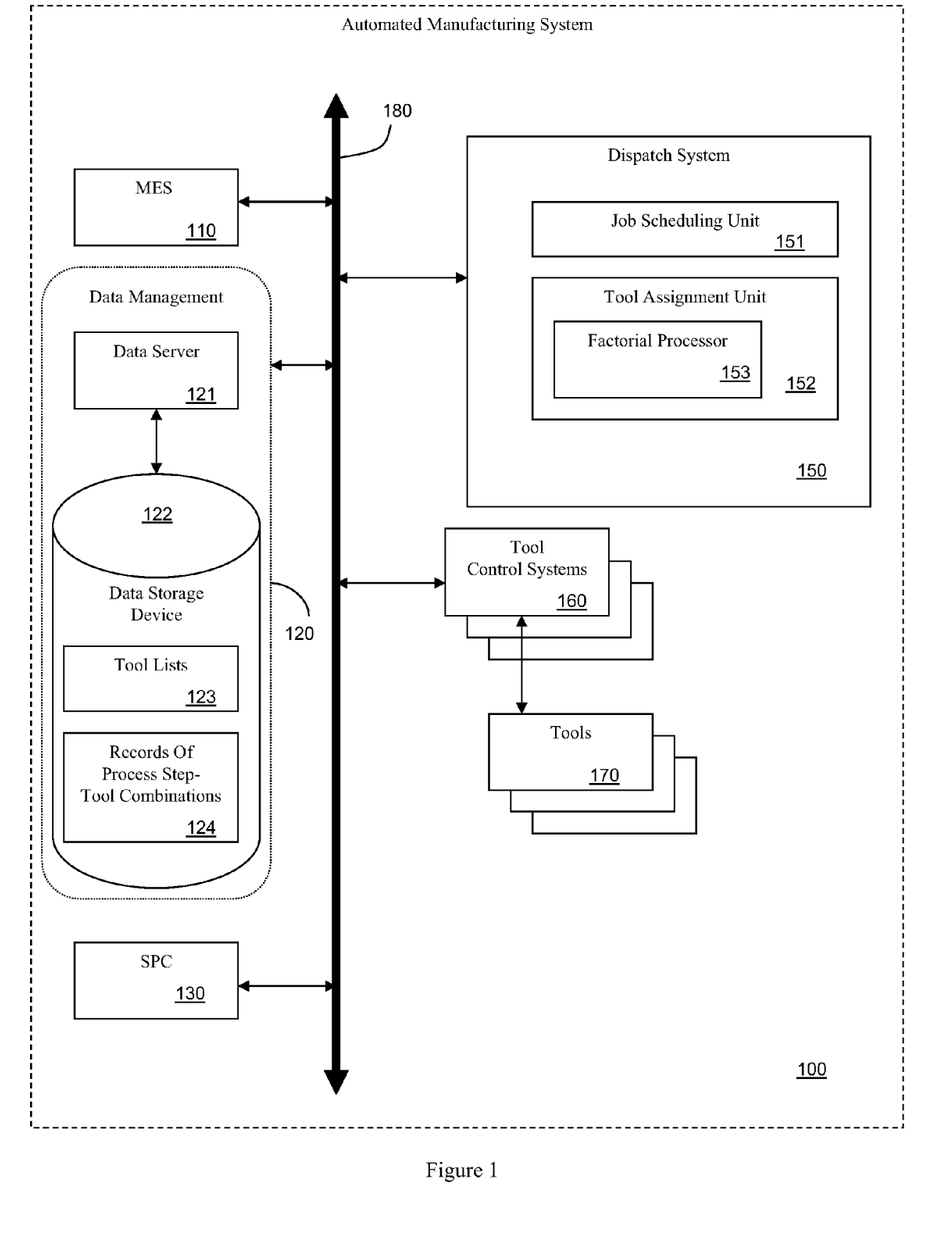
FIG. 1 is a block diagram illustrating an embodiment of an automated manufacturing system.

More particularly, referring to FIG. 1, disclosed herein are embodiments of an automated manufacturing system 100 for use in a fabrication environment (e.g., an integrated circuit (IC) product fabrication environment). The automated manufacturing system embodiments can incorporate a manufacturing execution system (MES) 110 adapted to control the automated manufacturing environment. That is, the MES 110 can be adapted to collect and store data, manage work orders, manage and control manufacturing processes, monitor and correct manufacturing processes, manage inventory, etc. In order to accomplish these tasks, the manufacturing system 100 can comprise various other systems (e.g., a work order management system, a data management system 120, a run-time dispatch system 150, tool control systems 160 for multiple tools 170, an SPC system 130, an inventory management system, etc.) that are integrated with the MES 110 (e.g., over a communication system 180, such as a network, bus, etc.).

The data management system 120 can, for example, comprise a data server 121 adapted to control one or more data storage devices 122 for storing data related to the fabrication process. One such data storage device 122 can be adapted to store lists of processing tools 123. For example, referring to FIG. 2 in combination with FIG. 1, each list can correspond to a specific type of process step (e.g., see lists 201a-c corresponding to process steps A, B and C, respectively). Furthermore, each list can comprise (i.e., identify, name, indicate, etc.) one or more process-specific tools that are adapted to perform a specific process step A, B or C and that are also available for performing that specific process step (e.g., see tools 202a in list 201a, tools 202b in list 201b, tools 202c in list 201c, etc.). Thus, for example, in an IC product fabrication environment, these process steps can comprise film depositing, photolithographic patterning, pattern transferring (i.e., etching), polishing, etc. Each of the lists in the data storage device 122 can correspond to one of these specific process steps and the process-specific tools on each list can comprise, for example, film deposition tools, lithography tools, etching tools and polishing tools, respectively.

Referring again to FIG. 1, the run-time dispatch system 150 can be adapted to control the flow of jobs (i.e., sets of work pieces, such as, lots of semiconductor wafers) through the various consecutive process steps and tools 170 required for product fabrication. This run-time dispatch system 150 can comprise both a scheduling unit 151 that schedules the order in which multiple jobs will be processed (e.g., based on priority considerations) and an assignment unit 152 that assigns each job with a specific combination of process steps and tools (e.g., based on randomization considerations).

Specifically, the run-time dispatch system 150 can comprise a scheduling unit 151 adapted to automatically determine (i.e., schedule) the order in which multiple jobs will undergo processing. That is, the dispatch system 150 can determine the order in which each individual set of work pieces from a group that includes multiple sets of workpieces will be processed and, more particularly, can determine the order in which each individual lot of semiconductor wafers in a group including multiple lots of semiconductor wafers will be processed. The scheduling unit 151 can be adapted to determine this job order based, for example, on pre-established prioritization rules (e.g., due dates) such that the job (i.e., the individual set or lot) having the highest priority will be scheduled to go first, the job having the second highest priority will be scheduled to go next and so forth.

Processing in this case refers to the fact that each job (i.e., each set of workpieces, each lot of semiconductor wafers, etc.) must undergo the same multiple consecutive process steps (e.g., steps A, B, and C, discussed above). These multiple consecutive process steps A, B and C can comprise either all or a portion of the entire product fabrication process. For example, in an IC product fabrication environment, the multiple consecutive process steps at issue can be limited to front end of the line (FEOL) processing, middle of the line (MOL) processing and/or back end of the line (BEOL) processing. Even more specifically, the multiple consecutive process steps at issue can be limited to one aspect of FEOL, MOL or BEOL processing. For example, the multiple consecutive process steps can be limited to BEOL dual damascene interconnect formation.

As mentioned above, each of these process steps may be accomplished using one or more different available processing tools. In order for a SPC system 130 to not only detect, for a given process step, product variability outside desired specifications, but also to efficiently de-convolve such product variability, the different processing tools must be evenly distributed across the jobs.

Therefore, in order to ensure that the different process tools are distributed evenly across the jobs, the run-time dispatch system 150 of the present invention also comprises an assignment unit 152 adapted to assign to each job (i.e., to assign to each individual set of workpieces, such as, to assign to each individual lot of semiconductor wafers) a different combination of process steps and tools that should be employed. Specifically, the assignment unit 152 can be in communication with the data storage device 122 (e.g., over network/bus 180) and can be adapted to access the lists of tools 123 stored in the data storage device 122. The assignment unit 152 can further be adapted to determine, based on those lists 123, possible combinations of process steps and tools that can be used to process any single job (i.e., any single set of work pieces, any single lot of wafers, etc.). The assignment unit 152 can further be adapted to assign these different combinations of process steps and tools to multiple jobs that require processing. That is, the assignment unit 152 is adapted to assign a different combination of process steps and tools to each set of work pieces being processed (e.g., to each lot of semiconductor wafers being processed).

Assignment of the different combinations of process steps and tools can be based, for example, on pre-established randomization rules for process combinations such that, when all of the jobs are subsequently processed in the job order scheduled by the scheduling unit 151 and according to the assigned combinations of process steps and tools, the processing tools 170 are evenly distributed across the jobs (i.e., across the multiple sets of work pieces, for example, across the multiple lots of wafers). Without this randomized assignment process, it is likely that some combinations would be repeated and others would be missed during the processing of any group of consecutive jobs. This problem of missing combinations becomes more acute as the number of process permutations increases.

Figure 3:
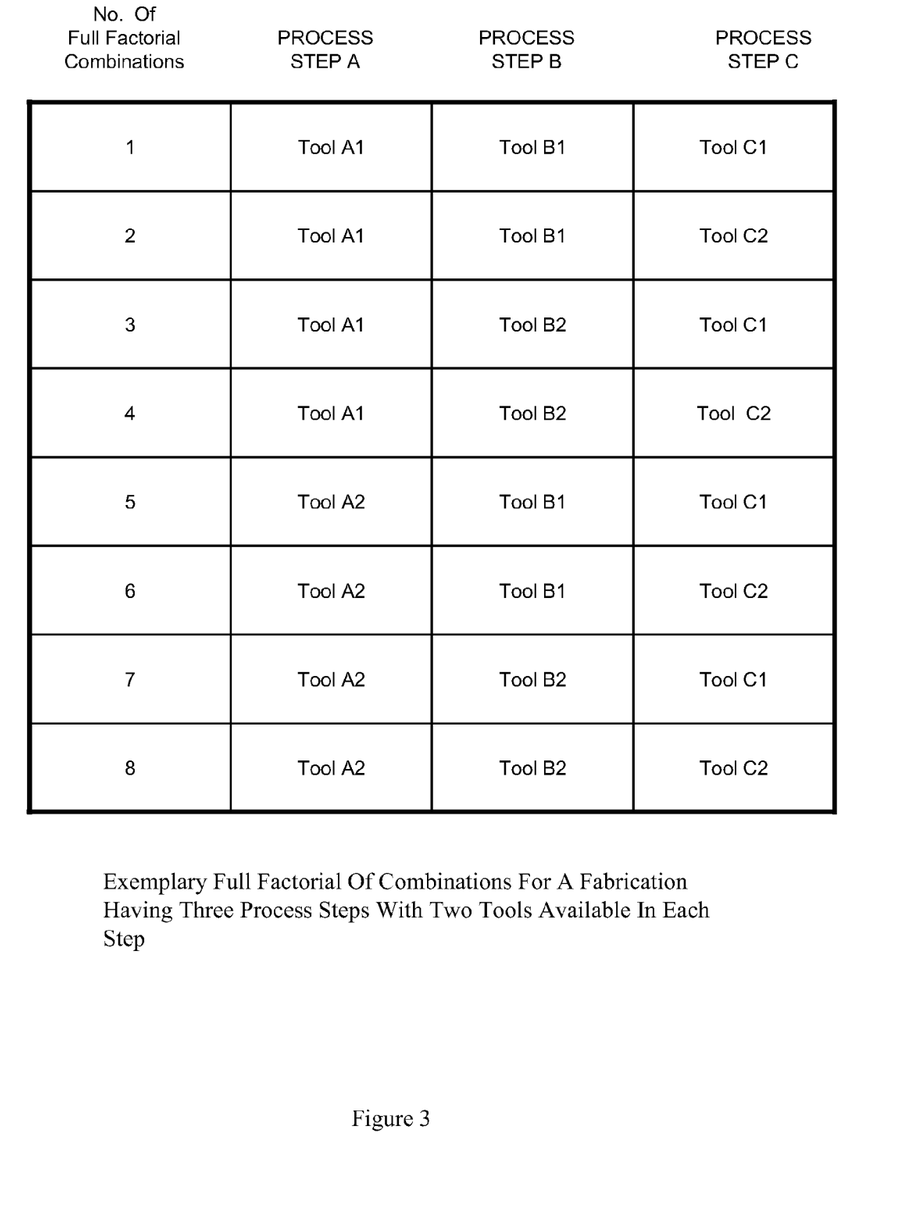
FIG. 3 is a table illustrating an exemplary full factorial of combinations of process steps and tools.

In one embodiment of the present invention, the assignment unit 152 can comprise a factorial processor 153 that is adapted to determine a full factorial of possible combinations of process steps and tools. The assignment unit 152 can further be adapted to assign this full factorial of possible combinations in sequence to the jobs (i.e., sets, lots, etc.) such that if the total number of possible combinations is m, then assignment of the combinations will repeat after every mth job in the scheduled job order. For example, FIG. 3 illustrates an exemplary full factorial of combinations for three process steps A, B and C. For each process step A, B and C, there are two process-specific tools available for completing the jobs (see tools A1-A2 for step A, tools B1-B2 for step B and tools C1-C2 for step C). Thus, the total number m of combinations is 8 and assignment of these combinations will repeat after every $8^{th}$ job (i.e., $8^{th}$ set, $8^{th}$ lot, etc.) in the scheduled job order such that the tools A1-A2, B1-B2, and C1-C2 are evenly distributed. It should be noted that in this embodiment, the combinations do not need to be assigned in any specific sequence, apart from the randomization considerations, because for every mth job, all of the combinations in the full factorial will be repeated one time. During subsequent analysis, this full factorial allows a specific tool at a specific process step to be identified as the primary cause of a detected product variation and further allows interactions between process steps to be characterized if they exist.

Figure 4:
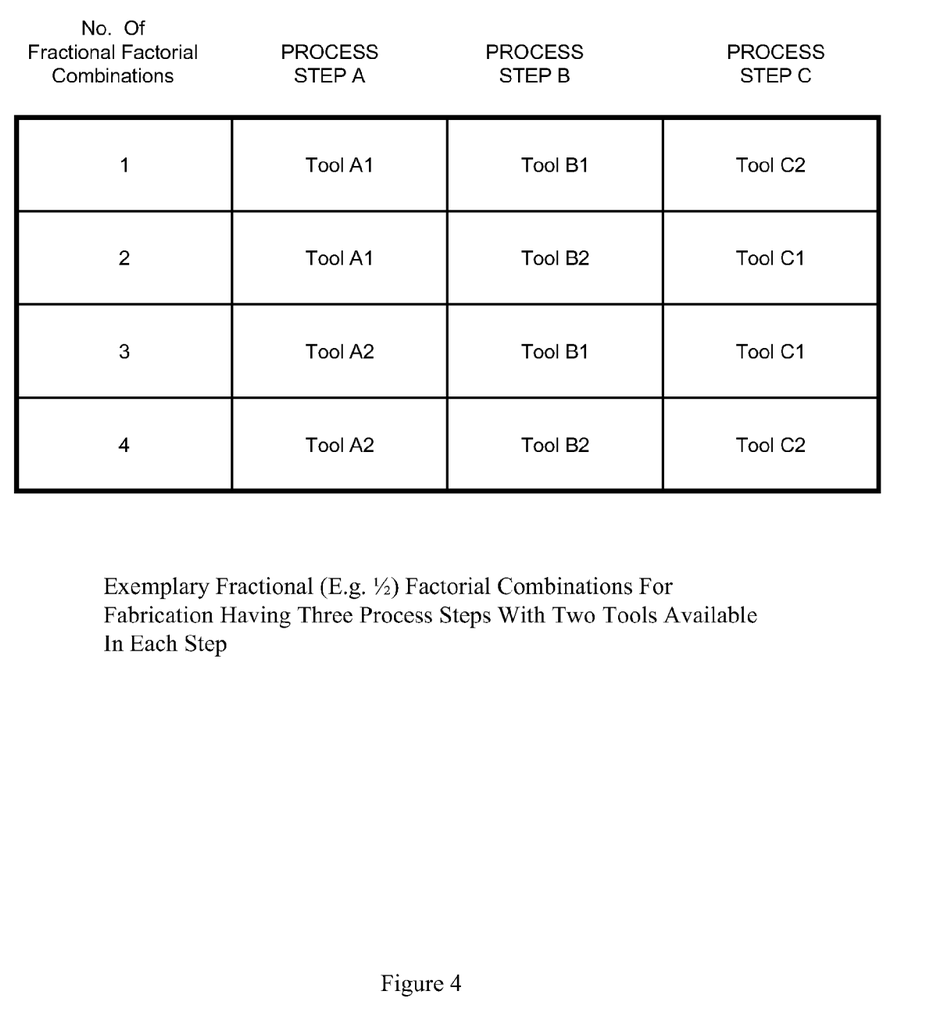
FIG. 4 is a table illustrating an exemplary fractional factorial of combinations of process steps and tools.

In another embodiment, the assignment unit 152 can comprise a factorial processor 153 adapted to determine a 1/n factorial of possible combinations. The assignment unit 152 can further be adapted to assign this 1/n factorial of possible combinations in sequence to the jobs (i.e., sets, lots, etc.) such that if the total number of possible combinations is m, then assignment of the combinations will repeat after every m/nth job in the scheduled job order. For example, FIG. 4 illustrates an exemplary ½ factorial of combinations for three process steps A, B and C. For each process step A, B and C, there are two process-specific tools available for completing the jobs (see tools A1-A2 for step A, tools B1-B2 for step B and tools C1-C2 for step C). Thus, the total number m of combinations is 8 and assignment of the ½ factorial of combinations with repeat after every $4^{th}$ job (i.e., $4^{th}$ set, $4^{th}$ lot, etc.) in the scheduled job order. It should be noted that in this embodiment, the combinations do not need to be assigned in any specific sequence, apart from the randomization considerations, because for every m/nth job, all of the combinations in the fractional factorial will be repeated one time. This embodiment is more efficient in that it provides for even distribution of the tools without requiring a full factorial of combinations. Consequently, during the subsequent analysis of a detected product variation, because the tools are evenly distributed using a lesser number of combinations, a specific tool at a specific process step can be quickly identified as the primary contributor to the detected product variation. However, this greater efficiency is traded off against an inability to characterize interactions between process steps. Specifically, because all of the combinations of process steps and tools are not employed, interactions between process steps, if present, can not be characterized.

Figure 5:
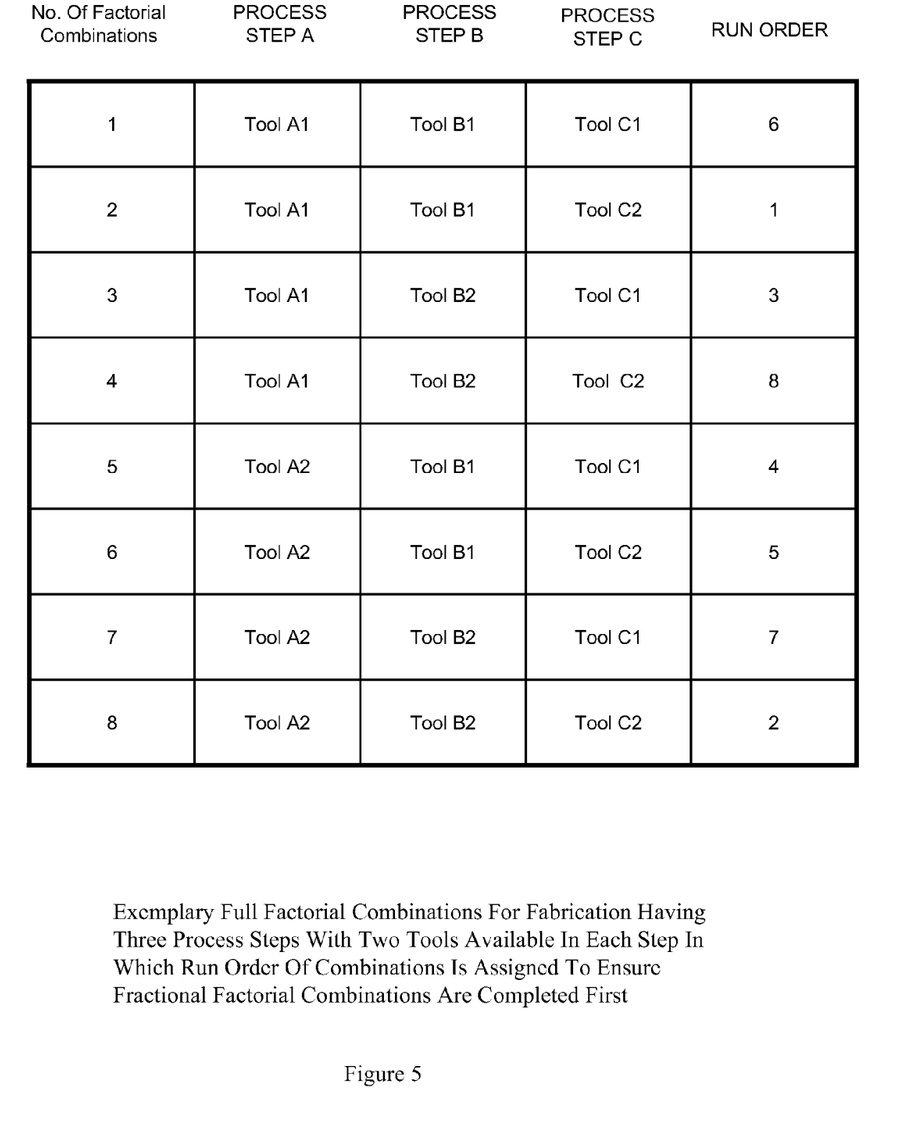
FIG. 5 is a table illustrating an exemplary full factorial of combinations of process steps and tools, wherein the run order of the combinations is assigned to ensure that a fractional factorial of the combinations are completed first.

Finally, in yet another embodiment, the assignment unit 152 can comprises a factorial processor 153 adapted to determine a full factorial of possible combinations of process steps and tools and also to determine a 1/n factorial of possible combinations of process steps and tools. The assignment unit 152 can further be adapted to assign the 1/n factorial of possible combinations in sequence to the jobs (i.e., sets, lots, etc.) followed by assigning any remaining combinations in the full factorial of possible combinations such that if the total number of possible combinations is m, then assignment of the combinations will repeat after every mth job in the scheduled job order. For example, FIG. 5 illustrates a full factorial of combinations for three process steps A, B, and C. For each process step A, B and C, there are two process-specific tools available for completing the jobs (see tools A1-A2 for step A, tools B1-B2 for step B and tools C1-C2 for step C). Thus, the total number m of combinations is 8 and assignment of these combinations will repeat after every $8^{th}$ job (i.e., $8^{th}$ set, $8^{th}$ lot, etc.) in the scheduled job order such that the tools A1-A2, B1-B2, and C1-C2 are evenly distributed. However, the run order for using the full factorial of combinations is predetermined such that the ½ factorial of combinations (e.g., as illustrated in FIG. 4) is completed first. Consequently, during subsequent analysis of a detected product variation, a specific tool at a specific process step can quickly be identified as the primary contributor to the product variation and interactions between process steps, if present, can also be identified. Specifically, since a fractional factorial of combinations is employed first, the tools are distributed evenly using a lesser number of combinations. Thus, a specific tool at a specific process step can be identified quickly as the primary contributor to a detected product variation. Additionally, because all of the combinations of process steps and tools are eventually employed, interactions between process steps can be characterized, if present.

As mentioned above, the manufacturing system 100 can comprise a data storage device 122. This data storage device 122 can further be adapted to store records 124 of the combinations of process steps and tools that were actually employed to process each of the jobs (i.e., sets, lots, etc.).

Also, as mentioned above, the manufacturing system 100 can comprise a statistical process control (SPC) system 130. This SPC system 130 can be a conventional SPC system adapted to collect data from samples at various points within each process step and, based on the collected data, identify product variability at a specific process step. The SPC 130 can also be adapted to characterize the influence of the process step/tools on product variability. Specifically, due to the even distribution of processing tools over process steps, the SPC 130 can further be adapted to determine which specific processing tool that was used in the performance of a specific process step on multiple jobs (i.e., on multiple sets of work pieces, for example, on multiple lots of wafers) was a largest contributor to product variability. That is, based on the records 124, the SPC system 130 can determine which one of multiple process-specific tools used during the performance of a specific process step on one or more of the multiple jobs (i.e., multiple sets of work pieces, for example, multiple lots of wafers) was the primary cause of the resulting product being out-of-specification (e.g., of work pieces or wafers having parameters outside specified limits). For example, referring to FIG. 3, 4 or 5, the SPC system 130 can determine whether tool A1 or A2 at step A, tool B1 or B2 at step B or tool C1 or C2 at step C was the primary cause of a variation between products (i.e., work pieces, wafers, etc.). Additionally, if a full factorial of combinations is assigned (e.g., as in FIG. 3 or FIG. 5), the SPC system 130 can be adapted to determine, based on the stored records 124, which process step interactions, if any, contributed to product variability. For example, the SPC 130 can recognize that product variation is not simply the result of tool B2 being used to perform step B, but rather a combination of tool A1 being used to perform step A and tool B2 being used to perform step B.

It should be understood that FIGS. 3-5, each of which illustrate three process steps and two available process specific tools for each process step, are not intended to be limiting. That is, the dispatch system 150 of the manufacturing system 100 can be adapted to generate and assign factorial combinations for two or more consecutive process steps, where each of the process steps has a different number of process-specific tools available. Additionally, while the factorial combinations discussed above are described in terms of sets of work pieces (e.g., lots of wafers) being processed by specific tools at each consecutive process step, it should be understood that such factorial combinations can further be expanded out. For example, the factorial of combinations can be expanded to include tool sub-component assignments (e.g., chamber assignments, where each tool includes multiple chambers). That is, a job (e.g., a set of work pieces, a lot of semiconductor wafers, etc.) can be assigned to a specific tool and within that tool individual work pieces/wafers can further be assigned to a specific sub-component of the tool (e.g., to a specific chamber within the tool) in order to allow subsequent identification of a specific subcomponent of a specific tool at a specific process step as being contributor to product variation and, optionally, to identify tool interactions, if present.

Figure 2:
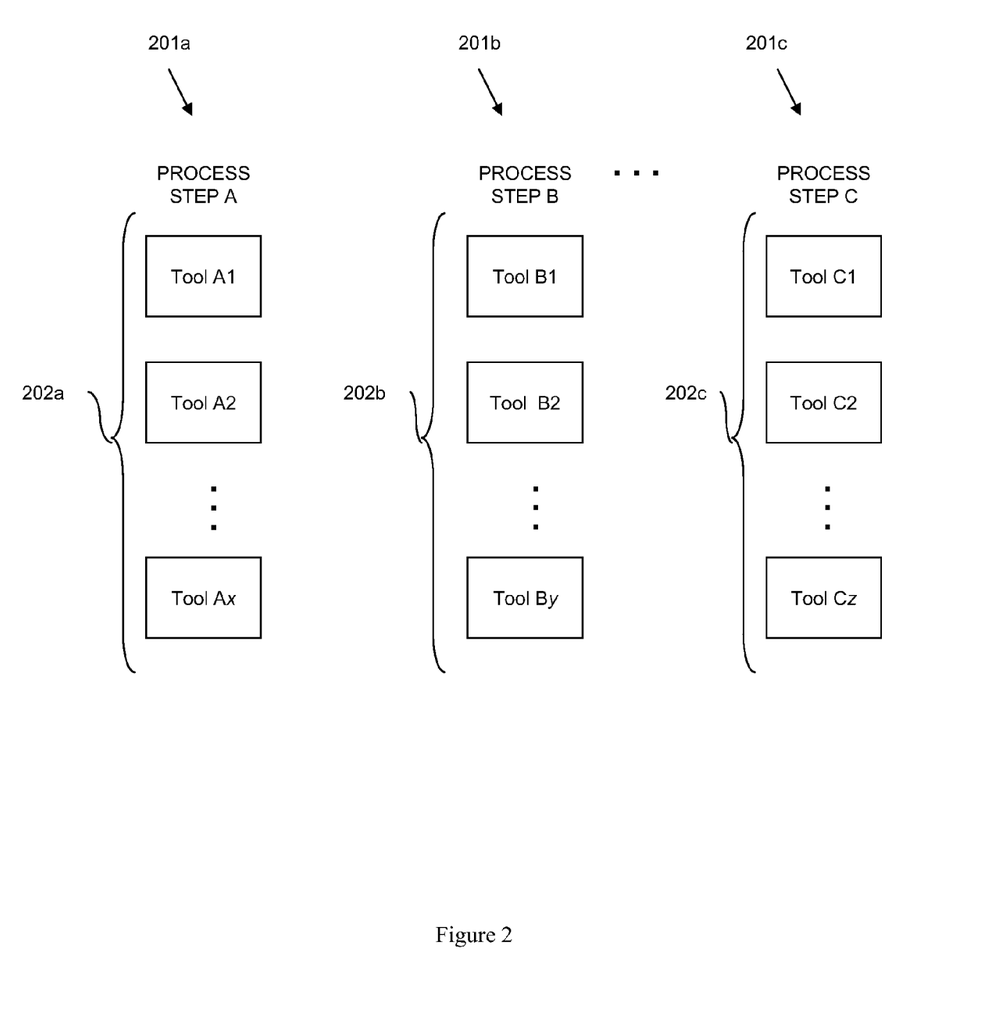
FIG. 2 is a block diagram illustrating exemplary tool lists.
Figure 6:
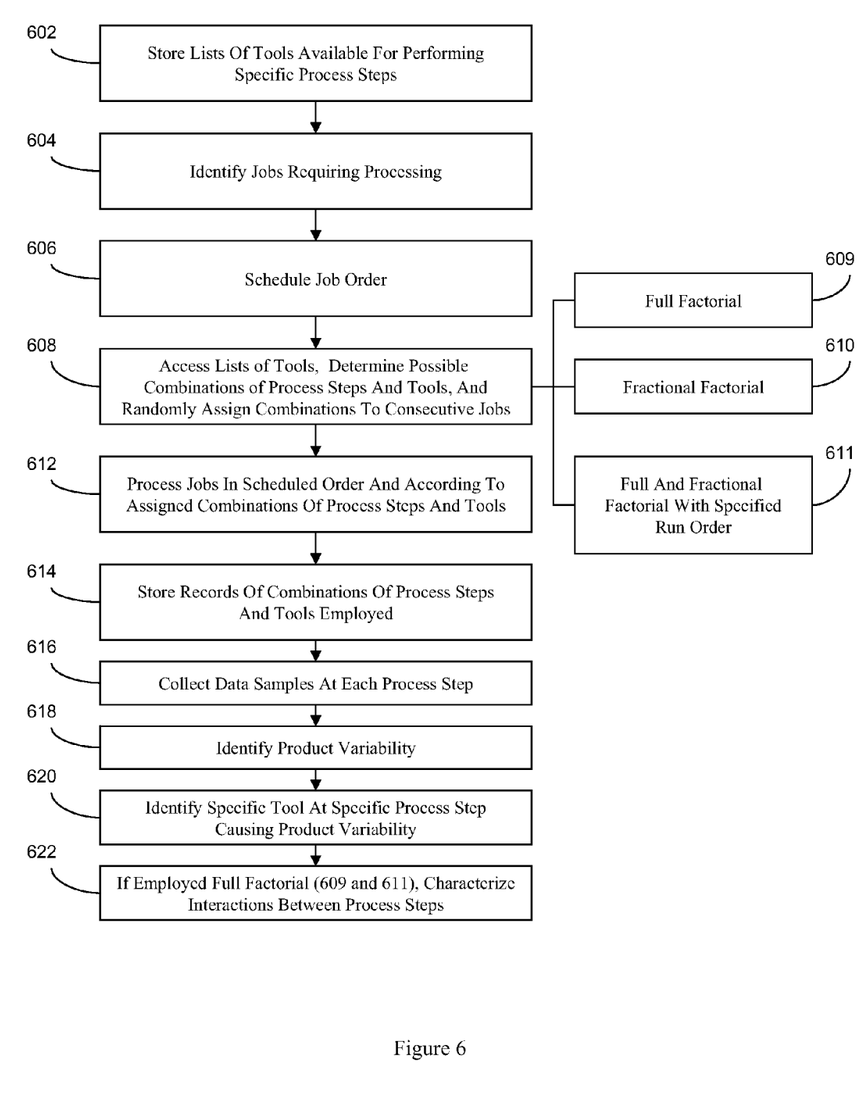
FIG. 6 is a flow diagram illustrating an embodiment of the method of the invention.

Referring to items 602-622 in the flow diagram of FIG. 6, disclosed herein are embodiments of an automated manufacturing method and, more particularly, an automated dispatching method for use in a fabrication environment (e.g., an integrated circuit (IC) product fabrication environment). The dispatching method can comprise storing lists of processing tools 123 (e.g., in a data storage device 122) (602, see also FIG. 1). For example, as illustrated in FIG. 2, each list can correspond to a specific type of process step (see tool lists 201a-c corresponding to process steps A, B, and C, respectively). Additionally, each list can comprise (i.e., indicate, name, identify, etc.) at least one process-specific tool adapted to and available for performing that specific process step (e.g., see tools 202a in list 201a, tools 202b in list 201b, tools 202c in list 201c, etc.). For example, in an IC product fabrication environment, these process steps can comprise film depositing, photolithographic patterning, pattern transferring (i.e., etching), polishing, etc. Each stored list stored can correspond to one of these process steps and the process-specific tools on each list can comprise film deposition tools, lithography tools, etching tools and polishing tools, respectively.

Next, the method can comprise identifying jobs (i.e., sets of work pieces, lots of semiconductor wafers, etc.) requiring processing (604). For example, in an IC product fabrication environment, this identifying process can comprise identifying which lots are ready to undergo processing. In this case processing refers to the fact that each job (i.e., each set of work pieces, each lot of semiconductor wafers, etc.) must undergo the same multiple consecutive process steps, which can comprise all or a portion of the entire fabrication process. For example, in an IC product fabrication environment, the multiple consecutive process steps included in the processing can be limited to front end of the line (FEOL) processing, middle of the line (MOL) processing and/or back end of the line (BEOL) processing. Even more specifically, the multiple consecutive process steps included in the processing can be limited to one aspect of FEOL, MOL or BEOL processing. For example, it can be limited to BEOL dual damascene interconnect formation.

Then, the job order for processing is automatically scheduled (606). That is, the order for processing each of the individual sets of work pieces in a group including multiple sets of workpieces is determined (e.g., the order for processing each of the individual lots of semiconductor wafers in a group including multiple lots of semiconductor wafers is determined). Scheduling can be based, for example, on some pre-established prioritization rules (e.g., product due dates) such that the job (i.e., the set or lot) with the highest priority will be scheduled to go first, the job with the second highest priority will schedule to go second and so forth.

Once the job order is established, then the lists of processing tools can be accessed and, based on those lists, a determination of possible combinations of process steps and tools that can be used to process any single job (i.e., any single set, any single lot, etc.) can be made. Next, the combinations of process steps and tools are assigned to the jobs (i.e., to the sets of work pieces, lots of semiconductor wafers, etc.) requiring processing (608). Assignment of the different combinations of process steps and tools can be based, for example, on pre-established randomization rules for process combinations such that, when all of the jobs are subsequently processed according to the scheduled job order and according to the assigned combinations of process steps and tools, the processing tools are evenly distributed across the jobs (i.e., across the sets of work pieces, across the lots of wafers, etc.).

For example, the processes of determining possible combinations of process steps and tools can comprise determining a full factorial of possible combinations (609). In this case the processes of assigning the combinations can further comprise assigning the full factorial of possible combinations such that if the total number of possible combinations is m, then assignment of the combinations will repeat after every mth job in the scheduled job order. For example, FIG. 3 illustrates an exemplary full factorial of combinations for three process steps A, B and C. For each process step A, B and C, there are two process-specific tools available for completing the steps (see tools A1-A2 for step A, tools B1-B2 for step B and tools C1-C2 for step C). Thus, the total number m of combinations is 8 and assignment of these combinations will repeat after every $8^{th}$ job (i.e., $8^{th}$ set, $8^{th}$ lot, etc.) in the scheduled job order such that the tools A1-A2, B1-B2, and C1-C2 are evenly distributed. During subsequent analysis (at processes 620 and 622, discussed below), this full factorial allows a specific tool at a specific process step to be identified as the primary cause of a detected product variation (see process 620) and further allows interactions between process steps to be characterized if they exist (see process 622).

Alternatively, the process of determining possible combinations of process steps and tools can comprise determining a 1/n factorial of possible combinations (610). In this case the process of assigning the combinations can further comprise assigning the 1/n factorial of possible combinations such that if the total number of possible combinations is m, then assignment of the combinations will repeat after every m/nth job in the scheduled job order. For example, FIG. 4 illustrates an exemplary ½ factorial of combinations for three process steps A, B and C. For each process step A, B and C, there are two process-specific tools available for completing the steps (see tools A1-A2 for step A, tools B1-B2 for step B and tools C1-C2 for step C). Thus, the total number m of combinations is 8 and assignment of the ½ factorial of combinations with repeat after every $4^{th}$ job (i.e., $4^{th}$ set, $4^{th}$ lot, etc.) in the order. This embodiment is more efficient in that it provides for even distribution of the tools without requiring a full factorial of combinations. Consequently, during the subsequent analysis of a detected product variation, because the tools are evenly distributed using a lesser number of combinations, a specific tool at a specific process step can be quickly identified as the primary contributor to the detected product variation (see process 620). However, this greater efficiency is traded off against an inability to characterize interactions between process steps. Specifically, because all of the combinations of process steps and tools are not employed, interactions between process steps, if present, can not be characterized.

Finally, the process of determining possible combinations of process steps and tools can comprise determining a full factorial of possible combinations as well as a 1/n factorial of possible combinations (611). In this case the process of assigning the combinations can further comprise assigning the 1/n factorial of possible combinations, followed by assigning any remaining combinations in the full factorial such that if the total number of possible combinations is m, then assignment of the combinations will repeat after every mth job in the scheduled job order. For example, FIG. 5 illustrates a full factorial of combinations for three process steps A, B, and C. For each process step A, B and C, there are two process-specific tools available for completing the steps (see tools A1-A2 for step A, tools B1-B2 for step B and tools C1-C2 for step C). Thus, the total number m of combinations is 8 and assignment of these combinations will repeat after every $8^{th}$ job (i.e., $8^{th}$ set, $8^{th}$ lot, etc.) in the scheduled job order such that the tools A1-A2, B1-B2, and C1-C2 are evenly distributed. However, the run order for using the full factorial of combinations is predetermined such that the ½ factorial of combinations (e.g., as illustrated in FIG. 4) is completed first. Consequently, during subsequent analysis of a detected product variation, a specific tool at a specific process step can quickly be identified as the primary contributor to the product variation (see product 620) and interactions between process steps, if present (see process 622). Specifically, since a fractional factorial of combinations is employed first, the tools are distributed evenly using a lesser number of combinations. Thus, a specific tool at a specific process step can be identified quickly as the primary contributor to a detected product variation. Additionally, because all of the combinations of process steps and tools are eventually employed, interactions between process steps can be characterized, if present.

Next, the jobs (i.e., the sets of work pieces, lots of semiconductor wafers, etc.) are processed in the scheduled order and according to the assigned combinations of process steps and tool such that the processing tools are evenly distributed across the jobs (i.e., across the sets of work pieces, across the lots of semiconductor wafers, etc.) (612). Records of the combinations of process steps and tools that were actually employed to process each of the jobs (i.e., to process each of the sets, to process each of the lots, etc.) are stored (e.g., on a data storage device) (614).

During processing, data samples can be collected at various points within each process step (616). Based on the collected data, product variability at a specific process step can be identified (618). Then, based on the records of process step-tool combinations, the specific processing tool that was used in the performance of a specific process step on multiple jobs (i.e., on multiple sets of work pieces, on multiple lots of semiconductor wafers, etc.) and that was the largest contributor to product variability can be identified (620). That is, based on the stored records of the combinations of process steps and tools actually employed to process each of the sets, a process-specific tool that was used during the performance of a specific process step on multiple jobs (can be identified as the primary cause of out-of-specification products (i.e., work pieces or wafers with measured parameters outside specified limits). For example, referring to FIG. 3, 4 or 5, a determination can be made as to whether tool A1 or A2 at step A, tool B1 or B2 at step B or tool C1 or C2 at step C was the primary cause of a product variation. Additionally, if a full factorial of possible combinations is assigned, interactions if any between the process steps that contributed to product variation can be identified (622). For example, referring to FIGS. 3 and 5, product variation may not simply be the result of tool B2 being used to perform step B, but rather a combination of tool A1 being used to perform step A and tool B2 being used to perform step B.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
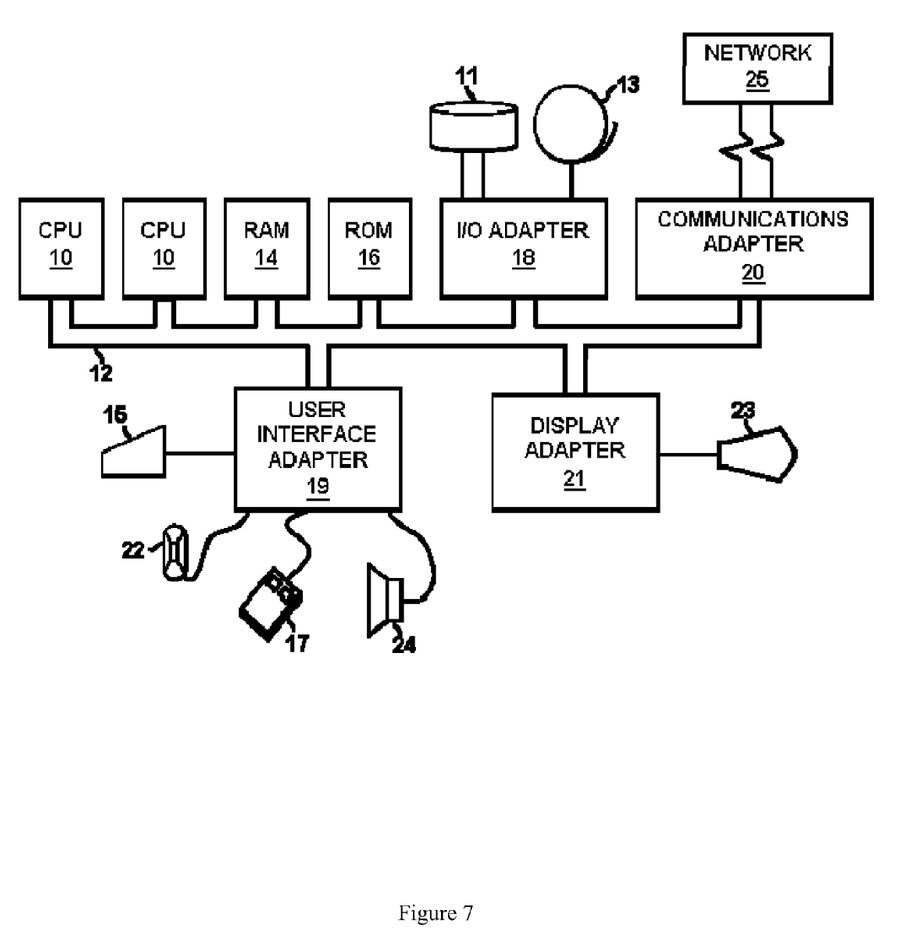
FIG. 7 is a schematic representation of a computer system suitable for use in conjunction with the embodiments described herein.

A representative hardware environment for practicing the embodiments of the invention is depicted in FIG. 7. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Therefore, disclosed above are embodiments of an automated manufacturing system that is used to process multiple jobs in a product fabrication environment (e.g., in an integrated circuit (IC) product fabrication environment), where such processing comprises performing the same multiple consecutive process steps for each job and where each process step can be accomplished using one or more different available processing tools. The manufacturing system incorporates, among other components, a unique run-time dispatch (RTD) system. Specifically, during manufacture, this run-time dispatch system schedules the order for processing jobs. That is, it establishes the order in which multiple sets of work pieces, for example, multiple lots of semiconductor wafers, will be processed. The run-time dispatch system further randomly assigns a particular combination of process steps and tools to each job (i.e., to each set of work pieces being processed, for example, to each lot of semiconductor wafers being processed) in such a way that the processing tools are evenly distributed across the jobs. Ensuring even distribution of processing tools allows a statistical process control (SPC) system to not only detect, for a given process step, product variability outside desired specifications, but also to efficiently de-convolve such product variability in order to identify the specific tool that is the source of the product variability or even to identify process step interactions that contribute to product variability.

In addition to benefiting SPC analysis, the above-described embodiments, would also be useful for defect and yield analysis (i.e., to determine whether a product operates at intermediate test points prior to build) and/or for performance analysis (i.e., to determine whether the product operates within specification after final build, whether it is better than average, etc.). Those skilled in the art will recognize that, when used for defect/yield and/or performance analysis, the invention would not operate differently but would include different data systems.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of embodiments, those skilled in the art will recognize that these embodiments can be practiced with modification within the spirit and scope of the appended claims.

What is claimed is:

1. An automated manufacturing system, said manufacturing system comprising:
   a dispatch system comprising a scheduling unit, said scheduling unit determining a job order for processing multiple jobs, said jobs each comprising the same multiple consecutive process steps;
   a data storage device storing lists of processing tools, each list comprising at least one process-specific tool adapted to perform a specific process step,
      said dispatch system further comprising an assignment unit in communication with said data storage device,
      said assignment unit accessing said lists from said data storage device, and determining, based on said lists, possible combinations of process steps and tools for processing said jobs and randomly assigning, to each of said jobs, a specific combination of said process steps and tools selected from said possible combinations such that, as said jobs are processed in said order, said processing tools are evenly distributed across said jobs, and
      said data storage device further storing records of specific combinations of said process steps and tools employed to process said jobs; and
   a statistical process control (SPC) system identifying product variability at any specific process step, said statistical process control (SPC) system further being in communication with said data storage device, accessing said records of said specific combinations from said data storage device and determining, based on said records of said specific combinations, which specific processing tool used when performing said specific process step was a largest contributor to said product variability.

2. The automated manufacturing system according to claim 1, said jobs comprising sets of work pieces.

3. The automated manufacturing system according to claim 1,
   said assignment unit further comprising a factorial processor determining a full factorial of said possible combinations, and
   said assignment unit further assigning said specific combination based on said full factorial such that if a total number of said possible combinations is m, then assignment of said specific combination will repeat after every mth job in said order.

4. The automated manufacturing system according to claim 1,
   said assignment unit further comprising a factorial processor determining a 1/n factorial of said possible combinations, and
   said assignment unit further assigning said specific combination based on said 1/n factorial such that if a total number of said possible combinations is m, then assignment of said specific combination will repeat after every m/nth job in said order.

5. The automated manufacturing system according to claim 1,
   said assignment unit further comprising a factorial processor determining a full factorial of said possible combinations and a 1/n factorial of said possible combinations, and said assignment unit further assigning said specific combination based on said 1/n factorial followed by any remaining combinations in said full factorial such that if a total number of said possible combinations is m, then assignment of said specific combination will repeat after every mth job in said order.

6. The automated manufacturing system according to claim 1, said statistical process control (SPC) system further identifying process step interactions that contributed to said product variability.

7. A dispatching method for use in a fabrication environment, said method comprising:
scheduling a job order for processing multiple jobs, said jobs each comprising the same multiple process steps;
storing lists of processing tools, each list comprising at least one process-specific tool adapted to perform a specific process step;
accessing said lists and determining, based on said lists, possible combinations of process steps and tools for processing said jobs;
randomly assigning, to each of said jobs, a specific combination of said process steps and tools selected from said possible combinations;
storing records of specific combinations of said process steps and tools assigned;
processing said jobs in said order such that each job is process with said specific combination of process steps and tools assigned, said randomly assigning ensuring that, as said jobs are processed in said order, said processing tools are evenly distributed across said jobs;
identifying product variability at any specific process step; and
based on said records of said specific combinations, determining which specific processing tool used when performing said specific process step was a largest contributor to said product variability.

8. The method according to claim 7, said jobs comprising sets of work pieces.

9. The method according to claim 7, said assigning further comprising determining a full factorial of said possible combinations and assigning said specific combination based on said full factorial such that if a total number of said possible combinations is m, then assignment of said specific combination will repeat after every mth job in said order.

10. The method according to claim 7, said assigning further comprising determining a 1/n factorial of said possible combinations and assigning said specific combination based on said 1/n factorial such that if a total number of said possible combinations is m, then assignment of said specific combination will repeat after every m/nth job in said order.

11. The method according to claim 7, said assigning further comprising determining a full factorial of said possible combinations and a 1/n factorial of said possible combinations and assigning said specific combination based on said 1/n factorial followed by any remaining combinations in said full factorial such that if a total number of said possible combinations is m, then assignment of said specific combination will repeat after every mth job in said order.

12. The method according to claim 7, further comprising: identifying process step interactions that contributed to said product variability.

13. A program storage device readable by computer and tangibly embodying a program of instructions executable by said computer to perform a dispatching method for use in a fabrication environment, said method comprising:
scheduling a job order for processing multiple jobs, said jobs each comprising the same multiple consecutive process steps;
storing lists of processing tools, each list comprising at least one process-specific tool adapted to perform a specific process step;
accessing said lists and determining, based on said lists, possible combinations of process steps and tools for processing said jobs;
randomly assigning, to each of said jobs, a specific combination of process steps and tools selected from said possible combinations;
processing said jobs in said order such that each job is process with said specific combination of process steps and tools assigned, said randomly assigning ensuring that, as said jobs are processed in said order, said processing tools are evenly distributed across said jobs;
identifying product variability at any specific process step; and
based on said records of said specific combinations, determining which specific processing tool used when performing said specific process step was a largest contributor to said product variability.

14. The program storage device according to claim 13, said jobs comprising sets of work pieces.

15. The program storage device according to claim 13, said assigning further comprising determining a full factorial of said possible combinations and assigning said specific combination based on said full factorial such that if a total number of said possible combinations is m, then assignment of said specific combination will repeat after every mth job in said order.

16. The program storage device according to claim 13, said assigning further comprising determining a 1/n factorial of said possible combinations and assigning said specific combination based on said 1/n factorial such that if a total number of said possible combinations is m, then assignment of said specific combination will repeat after every m/nth job in said order.

17. The program storage device according to claim 13, said assigning further comprising determining a full factorial of said possible combinations and a 1/n factorial of said possible combinations and assigning said specific combination based on said 1/n factorial followed by any remaining combinations in said full factorial such that if a total number of said possible combinations is m, then assignment of said specific combination will repeat after every mth job in said order.

* * * * *